United States Patent [19]
Coker

[11] Patent Number: 5,444,772
[45] Date of Patent: Aug. 22, 1995

[54] TELEPHONE LINE LOCKOUT DEVICE

[76] Inventor: Elzie L. Coker, 39051 Zephyr Cir., Hemet, Calif. 92543

[21] Appl. No.: 241,341

[22] Filed: May 11, 1994

[51] Int. Cl.⁶ .................. H04M 1/00; H04M 13/00; H04M 3/00
[52] U.S. Cl. .................. 379/161; 379/156; 379/184; 379/194
[58] Field of Search .............. 379/156, 161, 162, 165, 379/184, 194, 168

[56] References Cited

U.S. PATENT DOCUMENTS

| | | | |
|---|---|---|---|
| 4,000,375 | 12/1976 | Kawamura | 379/184 |
| 4,000,376 | 12/1976 | Springer | 379/184 |
| 4,266,103 | 5/1981 | White | 379/161 |
| 4,511,767 | 4/1985 | Wetzel | 379/161 |
| 4,805,210 | 2/1989 | Griffith | 379/161 |
| 4,807,278 | 2/1989 | Ross | 379/194 |
| 4,809,317 | 2/1989 | Howe | 379/184 |
| 4,899,372 | 2/1990 | Wahi | 379/194 |
| 5,022,068 | 6/1991 | Fujisaki | 379/184 |

Primary Examiner—Stephen Chin
Assistant Examiner—Vijay Shankar

[57] ABSTRACT

A telephone extension controller for permitting controlled access of telephone line from one of a given number of extension telephones coupled thereto when each extension telephone is controlled with the same comprising a lock-out circuit adapted to be coupled to a ring wire or a tip wire, the lock-out circuit further adapted for allowing a selected extension telephone of a plurality of extension telephones coupled to a telephone line to control and prevent the other extension telephones from accessing the telephone line when its switch hook is raised, the lock-out circuit including an optoisolator photo-coupled Darlington transistor having a conducting section and a photo-activated section and a Zener diode coupled in series with the conducting section of the Darlington transistor and coupled in parallel with the photo-activated section of the Darlington transistor.

4 Claims, 4 Drawing Sheets

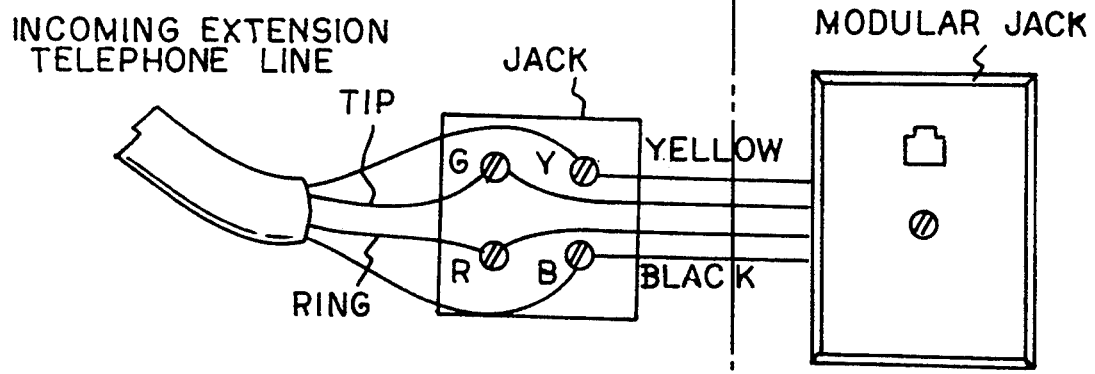
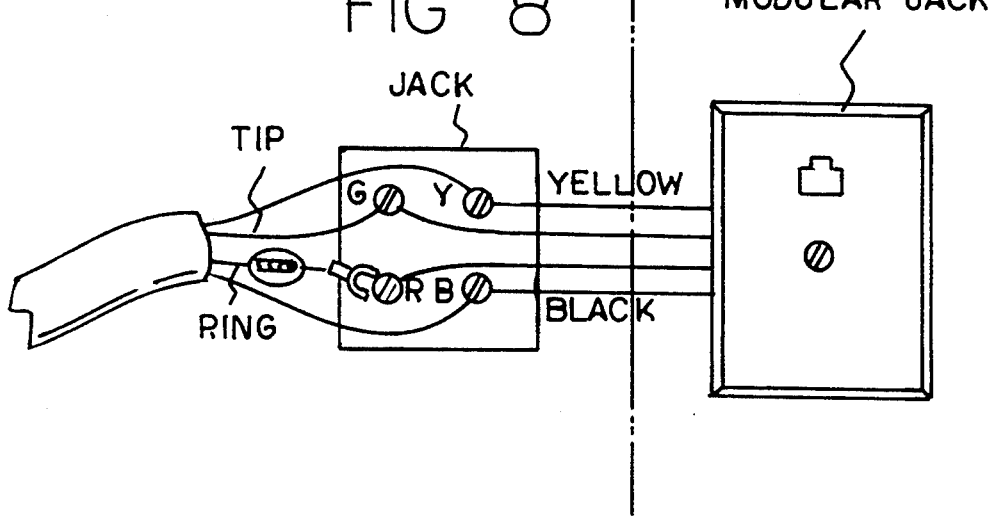

TELEPHONE LINE LOCKOUT DEVICE

BACKGROUND OF THE INVENTION

1. Field of the Invention

The present invention relates to a telephone line lockout device and more particularly pertains to permitting controlled access of telephone line from one of a given number of extension telephones coupled thereto when each extension telephone is controlled with the same with a telephone extension controller.

2. Description of the Prior Art

The use of telephone line controllers is known in the prior art. More specifically, telephone line controllers heretofore devised and utilized for the purpose of permitting access to telephone lines are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,000,376 discloses a telephone privacy device. U.S. Pat. No. 4,647,723 to Voorhies discloses a circuit for detection of off-hook condition of extension telephones. U.S. Pat. No. 4,747,128 to Chan et al. discloses a telephone privacy protector. U.S. Pat. No. 4,899,372 to Wahi et al. discloses a multi use telephone extension control circuit and device providing lockout for privacy. U.S. Pat. No. 4,985,916 to Tachuk et al. discloses a party line converter.

While these devices fulfill their respective, particular objective and requirements, the aforementioned patents do not describe a telephone line lockout device that allows a selected extension telephone to control a telephone line that is connected to a plurality of other extension telephones.

In this respect, the telephone line lockout device according to the present invention substantially departs from the conventional concepts and designs of the prior art, and in doing so provides an apparatus primarily developed for the purpose of permitting controlled access of telephone line from one of a given number of extension telephones coupled thereto when each extension telephone is controlled with the same.

Therefore, it can be appreciated that there exists a continuing need for new and improved telephone line lockout device which can be used for permitting controlled access of telephone line from one of a given number of extension telephones coupled thereto when each extension telephone is controlled with the same. In this regard, the present invention substantially fulfills this need.

SUMMARY OF THE INVENTION

In the view of the foregoing disadvantages inherent in the known types of telephone line controllers now present in the prior art, the present invention provides an improved telephone line lockout device. As such, the general purpose of the present invention, which will be described subsequently in greater detail, is to provide a new and improved telephone extension controller and method which has all the advantages of the prior art and none of the disadvantages.

To attain this, the present invention essentially comprises, in combination a lock-out circuit adapted for allowing a selected extension telephone of a plurality of extension telephones coupled to a common telephone line to control and prevent the other extension telephones from accessing this line when its switch hook is raised. The lock-out circuit includes an optoisolator photo-coupled Darlington transistor having a conducting section and a photo-activated section and a Zener diode coupled in series with the conducting section of the Darlington transistor and coupled in parallel with the photo-activated section of the Darlington transistor. A by-pass circuit is included and adapted for allowing the Darlington transistor to be momentarily deactivated when the extension telephone switch hook is raised and lowered, the by-pass circuit coupled in parallel with the Zener diode and conducting section of the Darlington transistor. The by-pass circuit includes an NPN transistor, a resistor coupled to the base of the NPN transistor, a capacitor coupled between the resistor and the collector of the NPN transistor, and a diode coupled between the resistor and emitter of the NPN transistor. Lastly, a full-wave diode bridge rectifier is included and has a first port, a second port, a third port, and a fourth port with the first port and third port coupled in parallel with the by-pass circuit and lock-out circuit and the second port and fourth port adapted to be coupled to the ring wire of a telephone line for making the lock-out circuit and by-pass circuit insensitive to polarity of the telephone line, thus allowing the telephone extension controller to be coupled to the ring wire without regard to telephone line polarity.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved telephone line lockout device which has all the advantages of the prior art telephone line controllers and none of the disadvantages.

It is another object of the present invention to provide a new and improved telephone line lockout device which may be easily and efficiently manufactured and marketed.

It is a further object of the present invention to provide a new and improved telephone line lockout device which is of durable and reliable construction.

An even further object of the present invention is to provide a new and improved telephone line lockout device which is susceptible of a low cost of manufacture with regard to both materials and labor, and which accordingly is then susceptible of low prices of sale to the consuming public, thereby making such a telephone extension controller economically available to the buying public.

Still yet another object of the present invention is to provide a new and improved telephone line lockout device which provides in the apparatuses and methods of the prior art some of the advantages thereof, while simultaneously overcoming some of the disadvantages normally associated therewith.

Even still another object of the present invention is to provide a new and improved telephone line lockout device for permitting controlled access of telephone line from one of a given number of extension telephones coupled thereto when each extension telephone is controlled with the same.

Lastly, it is an object of the present invention to provide a new and improved telephone line lockout device comprising a lock-out circuit adapted to be coupled to the ring wire in one orientation and the tip wire in another orientation, the lock-out circuit further adapted for allowing a selected extension telephone of a plurality of extension telephones coupled to a telephone line to control and prevent the other extension telephones from accessing the telephone line when its switch hook is raised, the lock-out circuit including an optoisolator photo-coupled Darlington transistor having a conducting section and a photo-activated section and a Zener diode coupled in series with the conducting section of the Darlington transistor and coupled in parallel with the photo-activated section of the Darlington transistor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 depicts the typical connection between the incoming telephone line to a jack and modular jack for subsequent coupling with a telephone extension to a telephone extension line.

FIG. 8 depicts the connection of the present invention with the ring wire of an incoming telephone line.

The same reference numerals refer to the same parts through the various Figures.

DESCRIPTION OF THE PREFERRED EMBODIMENT

Figure 1:
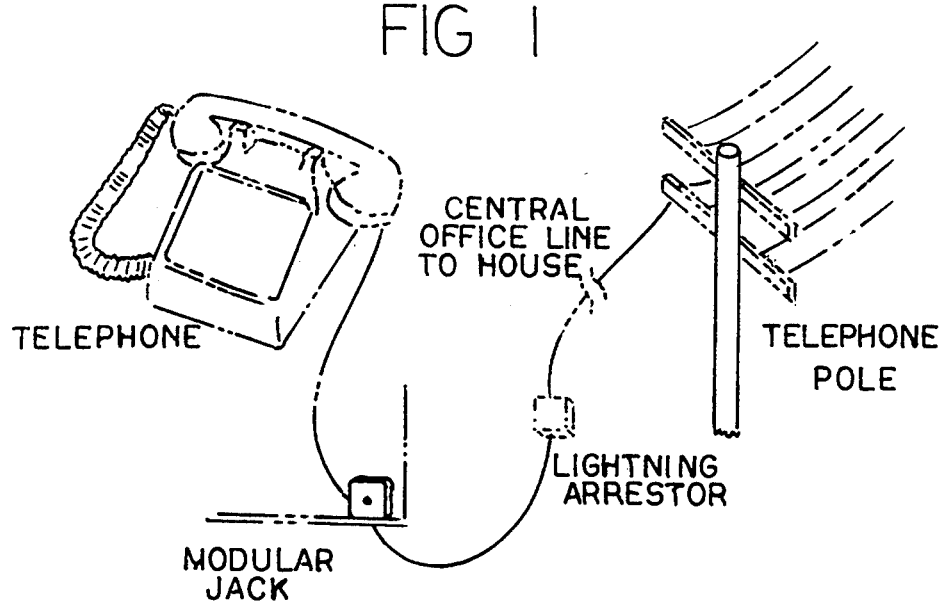
FIG. 1 depicts a typical household telephone installation with a telephone line extended from a central office along a plurality of telephone poles, to a lightning arrestor, to a jack or modular jack in the house, and, lastly, to a telephone.
Figure 2:
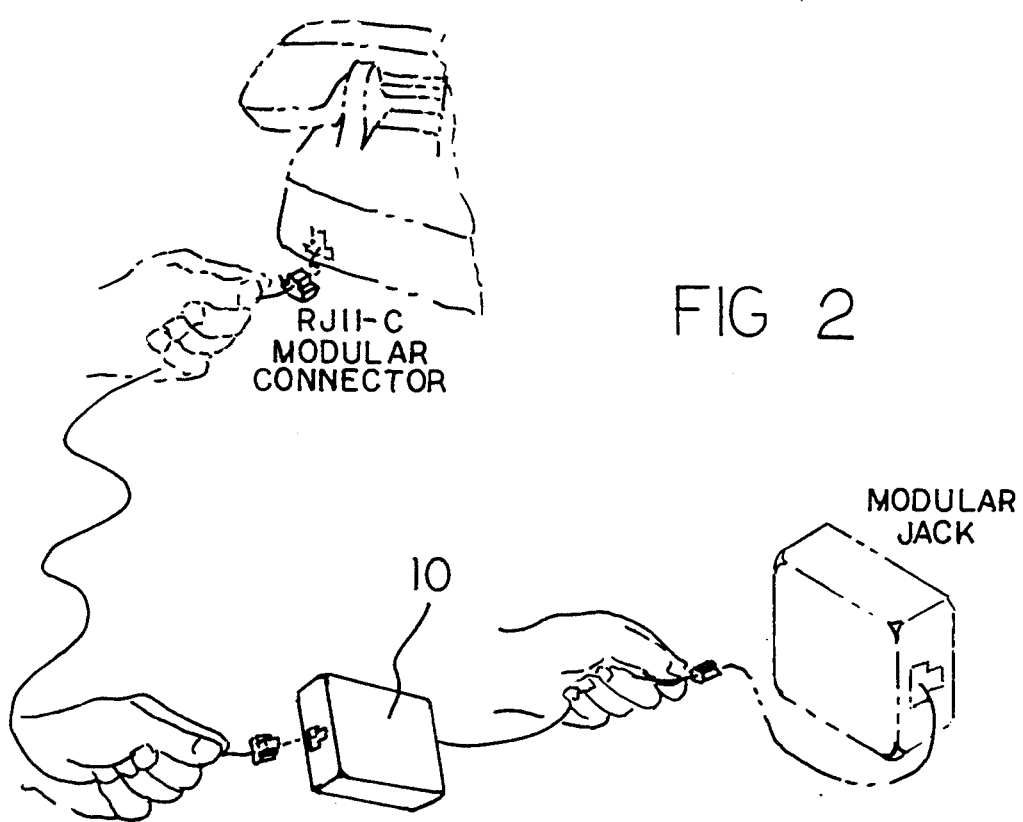
FIG. 2 depicts the modification of the typical household installation of FIG. 1 with the coupling of the present invention between a telephone and a junction box using two lines with each end of each line terminated at a RJ11-C modular connector. Each extension telephone in the house would have the present invention coupled between it and its associated modular jack.

With reference now to the drawings, and in particular, to FIG. 1 thereof, the preferred embodiment of the new and improved telephone line lockout device embodying the principles and concepts of the present invention and generally designated by the reference number 10 will be described.

Specifically, the present invention includes three major components. The major components are the lock-out circuit, the by-pass circuit, and the bridge rectifier. These components are interrelated to provide the intended function.

Figure 3:
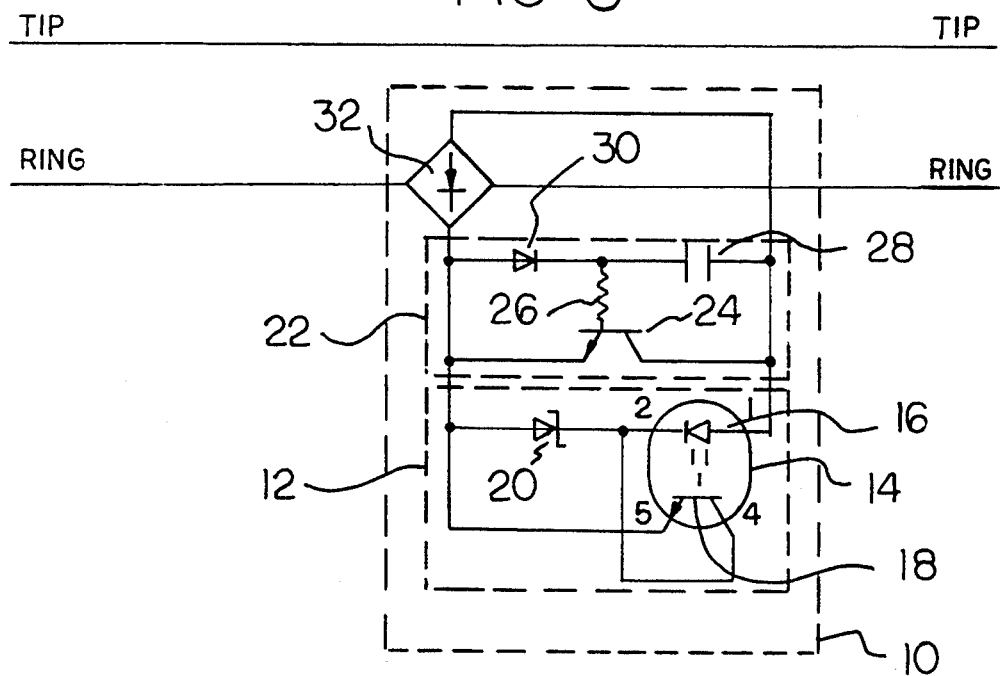
FIG. 3 is a schematic diagram of the present invention coupled to the ring wire of the tip-ring telephone wire pair that is extended from the modular jack for coupling with a telephone.

More specifically, it will be noted in FIG. 3 that the first major component is the lock-out circuit 12. The lock-out circuit is adapted for allowing a selected extension telephone of a plurality of extension telephones coupled to a common telephone line to control and prevent other extension telephones from accessing this line when its switch hook (FIG. 6) is raised. The lock-out circuit includes an optoisolator photo-coupled Darlington transistor 14. This Darlington transistor has a conducting section 16 and a photo-activated section 18. The lock-out circuit also includes a Zener diode 20. The Zener diode is coupled in series with the conducting section of the Darlington transistor as well as coupled in parallel with the photo-activated section of the Darlington transistor. This Zener diode is activated with a voltage of about 12 volts.

The second major component is the by-pass circuit 22. The by-pass circuit is adapted for allowing the Darlington transistor to be momentarily de-activated when the extension telephone switch hook is raised and lowered. The by-pass circuit is coupled in parallel with the Zener diode 20 and conducting section 16 of the Darlington transistor. The by-pass circuitry includes an NPN transistor 24. A resistor 26 is coupled to the base of the NPN transistor. A capacitor 28 is coupled between the resistor and the collector of the NPN transistor. Lastly, a diode 30 is coupled between the resistor and emitter of the NPN transistor.

The third major component is the bridge rectifier 32. The bridge rectifier is of the full-wave diode type. It has a first port, a second port, a third port, and a fourth port. The first port and the third port are coupled in parallel with the by-pass circuit and lock-out circuit. The second port and the fourth port are adapted to be coupled to the ring wire of a telephone line. The bridge rectifier functions to make the lock-out circuit and by-pass circuit insensitive to polarity of the telephone line. This allows the telephone line lockout device to be coupled to the ring wire without regard to telephone line polarity.

Figure 4:
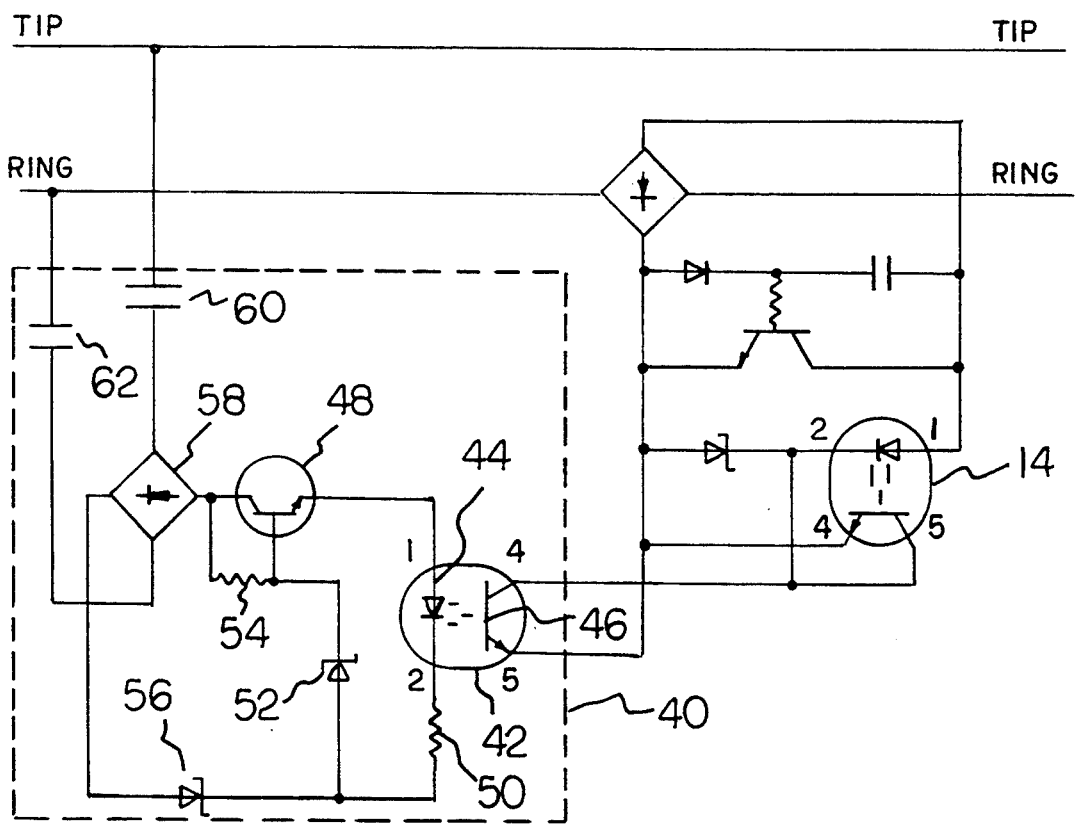
FIG. 4 is a schematic diagram of an alternate embodiment of the present invention including an add-on third party circuit coupled between the tip-ring telephone wire pair of the telephone extension line for allowing transfer of a telephone call from one extension line to another.
Figure 5:
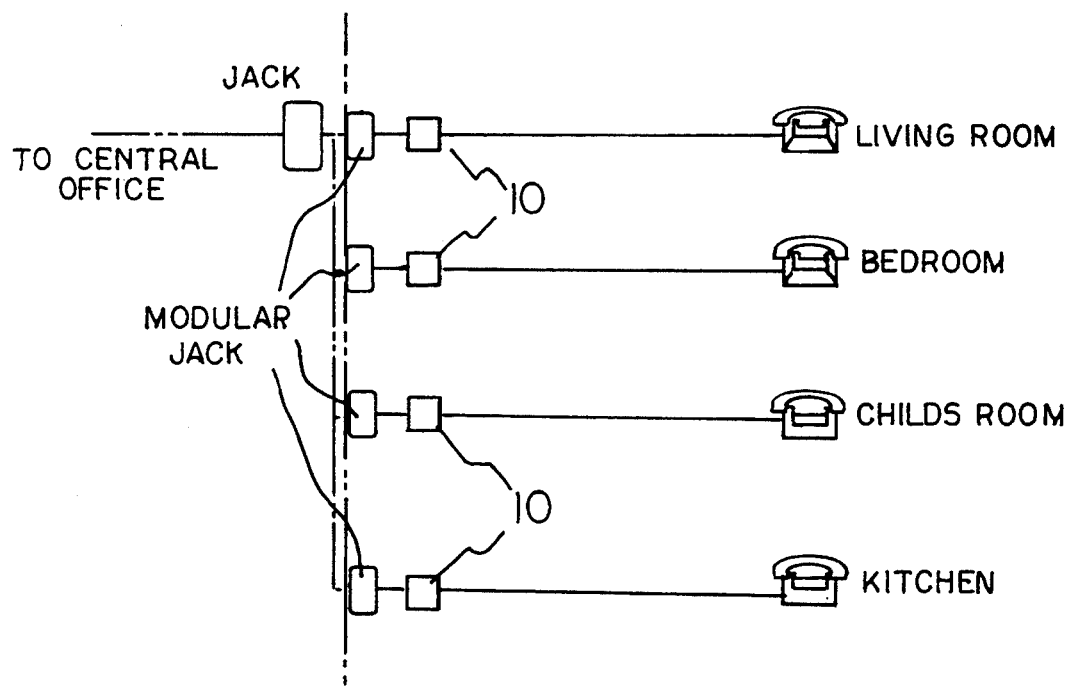
FIG. 5 is a schematic diagram of a typical telephone line in a home having a plurality of extension lines with extension telephones coupled thereto. The telephone line from the central office to terminated at a jack. This telephone line is then extended through this jack to a plurality of modular jacks located in rooms of the home. An extension telephone line is extended from the modular jack to an extension telephone. The present invention is coupled to each of these extension lines. The present invention allows one of these extension telephones to control the telephone line.

A second embodiment of the present invention is shown in FIG. 4. This embodiment includes substantially all of the components of the present invention further including an add-on third party circuit 40. The add-on third party circuit allows a different extension telephone to take control of the telephone line from the selected extension telephone. The add-on third party circuit includes a second optoisolator photo-coupled Darlington transistor 42. This Darlington transistor has a conducting section 44 and a photo-activated section 46. The conducting section is coupled in parallel with the conducting section of the Darlington transistor 14 of the lock-out circuit. A second NPN transistor 48 and a second resistor 50 are coupled to the photo-activated section 44 of the second Darlington transistor. A second Zener diode 52 is coupled between the base of the second NPN transistor 48 and the second resistor 50. This second Zener diode is activated with a voltage of about 6.2 volts. A third resistor 54 is coupled between the collector and the base of the second NPN transistor 48. A third Zener diode 56 is coupled to the second Zener diode 52 and second resistor 50. The third Zener diode is used for preventing inadvertent activation of the second Darlington transistor. This third Zener diode is activated with a voltage of about 12 volts.

The third party circuit also includes a second full-wave diode bridge rectifier 58. This second rectifier has a first port, second port, third port, and fourth port. The first port is coupled to the third Zener diode 56. The third port is coupled to the collector of the second NPN transistor 48. A second capacitor 60 is coupled to the second port of the second rectifier 58. The capacitor is also adapted to be coupled to the ring wire of a telephone line. A third capacitor 62 is coupled to the fourth port of the second rectifier 48. This third capacitor is also adapted to be coupled to the tip wire of a telephone line. The second capacitor in combination with the third capacitor isolates the third party circuit from DC current present on the telephone line.

A great number of homes have at least one additional telephone extension. In a home, there are typically about four phones positioned for easy use for calling out or someone calling in on the public dial-up system. In today's world, more business is being conducted at home along with information flow via telephone for voice, facsimile, computer and video. When conducting business by these communicating devices, an interruption by another handset connected on the same number line could be disastrous. In busy offices and small businesses, busy lines are often accessed accidentally. The present invention can prevent unwanted intrusions on telephone events when it is installed in front of each handset/terminal on the same telephone number. The controller is fully automatic, requiring no operator intervention. It restores all handsets/terminal connections to normal operations at conclusion of a event. The telephone line lockout device can easily be adapted to operate in a single line mode with installation performed by the user. The present invention can also operate in a multiple line mode through user installation. The present invention can also be coupled to a wall block module by a technician for operation with a single line. Use of the telephone extension line controller implies:

1) more that one handset connect to a single telephone number line
2) control for handset access without contention When one telephone is being used, anyone picking up a telephone on another extension can access the connection as well, which may not be desired by the original parties. More and more people are working in small businesses or out of home offices, which use multiple extensions on a single number telephone line, and are using facsimile machines and/or computers with modems to communicate over the telephone network. If someone picks up a telephone on an extension being used by a computer or facsimile machine, the data being transmitted can be ruined. In order to ensure privacy and data security, it is presently necessary to use a single dedicated line for each phone, computer, and facsimile machine. The present invention eliminates this drawback and provides privacy for single and dual telephone lines with multiple extensions at one location. With the controller monitoring each telephone handset, the first handset lifted off hook to access the line for call-out or a ring in will be the controlling handset for that event. Upon hang up of the telephone the / all switches are reset awaiting the next event. The switch uses a small amount of telephone line power when operating. No outside power is required.

The present invention is an electronic switch that is installed in the ring, or "wet" side of every extension that shares the same number. It is installed between the telephone set (or computer or facsimile machine) and its connection to the extension. Two versions are included. The first version, which is the preferred embodiment, provides privacy for whichever telephone is first picked up (for either incoming or outgoing calls). The second version, which is an alternate embodiment, provides the same privacy but allows a third party to be added to the line. Both versions are manufactured as plug-in modules with RJ11-C modular connections. The first version (privacy-only version) is also made for installation inside 4-wire junction boxes.

Electronic Switch Types:

Version 1—Privacy no add on line can be transferred from one telephone to another.

Version 2—Privacy add on. Third party can be added on line. Line can be transferred to another phone. Either type is adaptable to plug in module or wall block mounting. It can be installed in handset.

The first version (privacy-only version) uses a full-wave bridge to insert a lock-out circuit and a by-pass circuit in the ring side of the extension (the lock-out circuit and by-pass circuit may be referred to as the privacy only circuit). The lockout circuit consists of a 12 volt Zener diode and an optoisolator photo-coupled Darlington acting as a switch. With no current flowing, the line voltage is 48 V DC. When a call is received the circuit conducts and passes the AC ring signal to the handset or modem. All handsets of the extension telephones ring. The first handset that is picked up or modem that answers will cause optoisolator DC current flow to that extension. This DC current will trigger the Zener diode and photo-coupled optoisolator switch on the optoisolator, which subsequently shorts out the Zener diode when active. The line voltage will drop to 6 V as it becomes active (since the central office now detects current flow, thus lowering the line voltage from 48 volts to 6 volts). All other extensions remain blocked. If one of the other handsets of an extension telephone is raised (or a modem answers), no signals can be heard or transmitted from this handset (or modem). When the handset is lowered, DC current in the present invention ceases. The photo-coupled Darlington transistor switch off, and the circuit returns to its normal (inactive) state. Picking up a handset or activating a modem to initiate a call causes DC handset current to flow and activate that extension, while all other extensions remain blocked. If a call is to be switched to another extension, its handset is first picked up or modem activated, then the active telephone or modem is hung up to deactivate the first extension.

Figure 6:
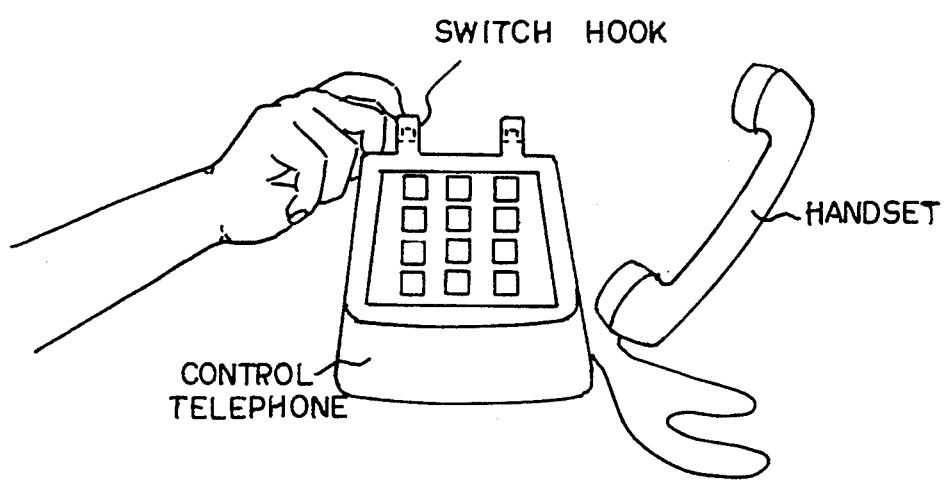
FIG. 6 depicts the actions required by a user when using the present invention to transfer a telephone call from one extension line to another extension line. First, the handset of the target telephone to be added for accessing the telephone line is raised. Next, the switchhook of the controlling telephone is lowered.

The alternate embodiment of the present invention (or second version) consists of the same privacy-only circuit further including an add-on circuit. The add-on circuit consists of another full-wave rectifier, emitter follower, and photo-coupled switch connected between the ring and tip lines. Two 1 μF capacitors block any DC potential while passing any AC component. The photo-coupled switch is connected in parallel with the photo-coupled switch of the privacy-only circuit across the Zener diode. When a call is in process on one extension with an add-on feature, and the handset on another extension with privacy of either type (the first version or the second version of the invention) is picked up, the second party may be added on line by the original (and controlling) handset switch hook being manually depressed and released as shown in FIG. 6.

A summary of information for the preferred and alternate embodiments of the present invention is provided below:

1. Installations:
   In series with the telephone handset in one leg of telephone line. Switch is non polarized.
2. Basic Information:
   1—Telephone line voltage levels approximated
      at rest 48 V DC
      off hook 6 V DC
      ringing 100 V DC
   2—Transistors-optoisolator/photo Darlington NPN
      Zeners 12 V Both switches
      6.2 V Add on switch
      Diode switching
      Resistors ¼ W
      Diode Bridge one—now add on switch, in line.
      two—add on switch, in line, across line.
      Capacitors 1/150 V Add on switch
      1/35 V Both switches.
3. Operation:
   a. Version 1 and Version 2:

When handset is lifted for ring in or call out, voltage (DC) across the line is 48 V DC, a circuit is completed for electron flow. The Zener will conduct through 2-1 section of optoisolator and handset as shown in FIG. 3. Conduction of the 2-1 section will turn on the 4-5 section. 4-5 section conducting will short (remove) the Zener from the circuit. Line voltage will drop to 6 V DC. Any extension telephone not off hook will be locked out (off) by its monitor since voltage level is below Zener turn on for other handsets.

First telephone off hook controls the line. To transfer line to another phone, lift handset on second phone. Since telephone handsets are not all constructed the same, additional circuit is required. A NPN transistor is electrically across the switch. The switch will not always turn off completely upon hang up, with some handsets. When voltage rises to 48 V DC upon hang up, and the handset is lifted to access the line again, the NPN will momentarily conduct shorting (resetting) the switch on. Capacitors recharging from 6 V to 48 V will also cause the switch to reset.

At this stage the switch is polarized and installation would have to observe polarity of the line to function correctly. Add a diode bridge to become non polarized.

b. Version 2—"Add on" switch type:

The line controller is same as described above. A second circuit is added to permit add on. In the described privacy model, when the line is transferred to a second telephone by lifting the handset on the second telephone and momentarily pressing switch hook on first phone, the second telephone set will come on line and the first (original) telephone will go silent. Circuitry for "add on" is across the telephone line, i.e. in parallel with the hand set. The "add on" circuit is capacitor connected to the telephone line. All DC current is blocked. When at rest, 48 volts is across the line. Capacitors will be charged to this level. When the handset is lifted 48 V drops to 6 V across the line. This is a 42 V change. This change from 48 volts to 6 volts or from 6 volts to 48 volts is rectified by a diode bridge and applied to an optoisolator—photo Darlington circuit as DC current. Since this change is very rapid and will occur each time the switch hook is raised or lowered, this change can be utilized to hold the original controlling telephone on line while adding another party on line. The optoisolator 4-5 section is electrically coupled across the 12 volt Zener diode in the line controller circuit (that is, the combination of stand-by circuit and lock-out circuit) in series with the handset. When the switch hook is depressed momentarily to add on a second party, the 4-5 section of the optoisolator will hold the line switch on line by shorting a 12 V Zener preventing a reset to occur. The rest of the add on circuit is to control the DC current through the 1-2 section of the optoisolator except the 12 V Zener. The Zener prevents turn on from line noise. To transfer a line (call) from one telephone to another, lift off the handset of second telephone then momentarily depress the switch hook of the first phone, hang up the first phone. To add on a second party, you must have the add on circuit. Lift the handset of the second phone, momentarily depress the switch hook of the first phone. Second telephone is added on line with first phone. Three way conversation can occur.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A telephone line lockout device comprising, in combination:
    a lock-out circuit adapted for allowing a selected extension telephone of a plurality of extension telephones coupled to and sharing a common telephone line to control and prevent the other extension telephones from accessing this line when its switch hook is raised, the lock-out circuit including an optoisolator photo-coupled Darlington transistor having a conducting section and a photo-activated section and a Zener diode coupled in series with the conducting section of the Darlington transistor and coupled in parallel with the photo-activated section of the Darlington transistor;
    a by-pass circuit adapted for allowing the Darlington transistor to be momentarily de-activated when the extension telephone switch hook is raised and lowered, the by-pass circuit coupled in parallel with the Zener diode and conducting section of the Darlington transistor, the by-pass circuit including an NPN transistor, a resistor coupled to the base of the NPN transistor, a capacitor coupled between the resistor and the collector of the NPN transistor, and a diode coupled between the resistor and emitter of the NPN transistor; and
    a full-wave diode bridge rectifier having a first port, a second port, a third port, and a fourth port with the first port and third port coupled in parallel with the by-pass circuit and lock-out circuit and the second port and fourth port adapted to be coupled to the ring wire of a telephone line for making the lock-out circuit and by-pass circuit insensitive to polarity of the telephone line, thus allowing the telephone extension controller to be coupled to the ring wire without regard to telephone line polarity.

2. A telephone line lockout device comprising a lockout circuit adapted to be coupled to the ring wire in one orientation and the tip wire in another orientation, the lock-out circuit further adapted for allowing a selected extension telephone of a plurality of extension telephones coupled to and sharing a telephone line to control and prevent the other extension telephones from accessing the telephone line when its switch hook is raised, the lock-out circuit including an optoisolator photo-coupled Darlington transistor having a conducting section and a photo-activated section and a Zener diode coupled in series with the conducting section of the Darlington transistor and coupled in parallel with the photo-activated section of the Darlington transistor.

3. The telephone line lockout device as set forth in claim 2 further including rectifier means coupled to the lock-out circuit and adapted to be coupled to a telephone line for making the lock-out circuit insensitive to polarity of the telephone line, thus allowing the telephone extension controller to be coupled to the telephone line without regard to telephone line polarity.

4. The telephone line lockout device as set forth in claim 1 further including an add-on third party circuit for allowing a different extension telephone to take control of the telephone line from the selected extension telephone with the add-on third party circuit further comprising:
    a second optoisolator photo-coupled Darlington transistor having a conducting section and a photo-activated section with the conducting section coupled in parallel with the conducting section of the Darlington transistor of the lock-out circuit;
    a second NPN transistor and a second resistor coupled to the photo-activated section of the second Darlington transistor;
    a second Zener diode coupled between the base of the second NPN transistor and the second resistor;
    a third resistor coupled between the collector and the base of the second NPN transistor;
    a third Zener diode coupled to the second Zener diode and second resistor for preventing inadvertent activation of the second Darlington transistor;
    a second full-wave diode bridge rectifier having a first, second, third, and fourth port with the first port coupled to the third Zener diode and the third port coupled to the collector of the second NPN transistor with the second rectifier adapted to apply a DC current to the second Darlington transistor;
    a second capacitor coupled to the second port of the second rectifier and adapted to be coupled to the ring wire of a telephone line; and
    a third capacitor coupled to the fourth port of the second rectifier and adapted to be coupled to the tip wire of a telephone line, with the second and third capacitors adapted to block DC current passed from the telephone line and further adapted to provide a changing current when the telephone line voltage changes.

* * * * *